US010286618B2

(12) United States Patent
Bahlke

(10) Patent No.: US 10,286,618 B2
(45) Date of Patent: May 14, 2019

(54) HANDLING DEVICE FOR TIRES

(71) Applicant: HARBURG-FREUDENBERGER MASCHINENBAU GMBH, Hamburg (DE)

(72) Inventor: Stefan Bahlke, Lüneburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 2 days.

(21) Appl. No.: 15/738,822

(22) PCT Filed: May 25, 2016

(86) PCT No.: PCT/DE2016/000225
§ 371 (c)(1),
(2) Date: Dec. 21, 2017

(87) PCT Pub. No.: WO2016/206670
PCT Pub. Date: Dec. 29, 2016

(65) Prior Publication Data
US 2018/0178466 A1 Jun. 28, 2018

(30) Foreign Application Priority Data

Jun. 22, 2015 (DE) .......................... 10 2015 008 118

(51) Int. Cl.
*B29D 30/06* (2006.01)
(52) U.S. Cl.
CPC ................ *B29D 30/0603* (2013.01)

(58) Field of Classification Search
CPC ................................................ B29D 30/0603
See application file for complete search history.

(56) References Cited

U.S. PATENT DOCUMENTS 4,447,385 A * 5/1984 Blosser ............. B29D 30/0603
264/315
4,452,577 A * 6/1984 Irie .................... B29D 30/0603
425/33
4,474,399 A 10/1984 Lauber
4,681,521 A 7/1987 Grotkasten
(Continued)

FOREIGN PATENT DOCUMENTS

DE         3443947 A1   6/1986
JP       2006297778 A   11/2006

*Primary Examiner* — James P Mackey
(74) *Attorney, Agent, or Firm* — Lucas & Mercanti, LLP; Klaus P. Stoffel

(57) ABSTRACT

A handling device for tires, having at least one gripping tool and an outrigger, wherein the outrigger by way of a first outrigger pivot point is fixed to a receptacle in such a manner that pivoting of the outrigger relative to the receptacle along a motion trajectory is supported. The outrigger has a second outrigger pivot point which couples the at least one gripping tool by way of a tool arm to the outrigger in such a manner that pivoting of the tool arm relative to the outrigger and/or to the receptacle along the motion trajectory is supported. At least one coupling at least partially coordinates the pivoting movements about the outrigger pivot points in such a manner that a total motion trajectory of the gripping tool is supported by way of at least partially superposed pivoting movements.

19 Claims, 11 Drawing Sheets

(56) References Cited

U.S. PATENT DOCUMENTS

| | | | |
|---|---|---|---|
| 5,017,111 A * | 5/1991 | Drewel | B29D 30/0603 |
| | | | 425/28.1 |
| 5,746,964 A | 5/1998 | Ureshino | |
| 6,241,501 B1 * | 6/2001 | Mitamura | B29D 30/0603 |
| | | | 425/38 |

* cited by examiner

HANDLING DEVICE FOR TIRES

The present application is a 371 of International application PCT/DE2016/000225, filed May 25, 2016, which claims priority of DE 10 2015 008 118.7, filed Jun. 22, 2015, the priority of these applications is hereby claimed and these applications are incorporated herein by reference.

BACKGROUND OF THE INVENTION

The invention relates to a handling device for tires, having at least one gripping tool and an outrigger, wherein the outrigger by way of a first outrigger pivot point is fixed to a receptacle in such a manner that pivoting of the outrigger relative to the receptacle along a motion trajectory is supported, and that the outrigger has a second outrigger pivot point which couples the at least one gripping tool by way of a tool arm to the outrigger in such a manner that pivoting of the tool arm relative to the outrigger and/or to the receptacle along a motion trajectory is supported.

Manufacturing a tire, for example for vehicles such as automobiles or motorcycles, is an extremely complex process which is composed of a multiplicity of manufacturing and processing steps. The reason therefor is the complicated construction of a tire, which is composed of a significant number of different individual components. Moreover, this multiplicity of components have to be interconnected under the effect of pressure and temperature, i.e. by so-called vulcanization.

Not only the finished tire as the final product of the tire manufacturing process, but already the tire blank is a highly complex component that is composed of many semi-finished product elements. As a result of the multi-layered construction, the individual components have to firstly and prior to a vulcanization process to be joined together, that is to say that the tire components are singularized to the correct size and fed to a carcass drum in a correct manner in terms of location, position, and orientation, said carcass drum being located within a tire-building machine. The tire blank is manufactured and prepared for vulcanizing in this way.

Many of the tire components are available as web-shaped and/or arcuate semi-finished products: various rubber compounds and natural-rubber composite materials, woven textile fabrics or textile cord, respectively, woven steel-belt fabrics, and natural-rubber sheathed bead cores. To some extent, layer servers are used within a tire-building machine in order for these web-shaped and/or arcuate semi-finished products to be fed to the carcass drum.

As a result of the significant number of production steps, production sites are set up in large sheds and comprise machines, systems, and handling means which are suitable for the individual production steps. These production lines or production centers are expanded by upstream and downstream equipment for preparing tire components or for post-processing or packing the finished tires, respectively.

A post-treatment process after vulcanization that is often required can be performed by targeted cooling of the finished tire that contains residual heat and optionally by an impingement with internal pressure. Since the finished tire that contains residual heat is structurally unstable and highly sensitive, particularly high requirements are set for the handling devices for removing tires from the treatment space of the tire vulcanization machine and transporting and placing, respectively, said tires in the post-treatment device. The handling devices are therefore equipped with suitable gripping tools which can also grip and pick up the sensitive tires. Gripping tools of this configuration are complex and expensive.

Handling devices which because of the function thereof within the tire production process and in terms of the treatment space of the tire vulcanization machine are also referred to as loaders or unloaders, must move the tire or tire blank to be handled across distances in all spatial directions and optionally change the orientation of the tire.

Furthermore, movements and changes in the orientation have to be carried out as fast as possible in order for the handling and transportation times to be kept as low as possible and for the overall process time of tire production to be minimized.

Positioning accuracy parameters having minor location and/or orientation deviations can also be part of the requirement spectrum set for handling devices. Such accuracy parameters can be required, for example, when loading or placing, respectively, the tire blank into the tire mold, into the container, or into the treatment space. Precise positioning is also required when the finished tires that still contain residual heat for the purpose of post-treatment are placed into the post-cure inflator or into the post-cure device, for example in order for the finished tire by way of the tire bead thereof to be deposited in a positionally accurate manner onto the tire plate.

Handling devices are often formed by a cantilever that is fixed to a base. The cantilever at one end is connected to the base by way of an articulation and at the other end thereof typically has a gripping tool. Fixing the cantilever in unarticulated manner to the base supports pivoting of said cantilever relative to the base.

These constructions are disadvantageous in that the distances of the gripping tools that can be implemented are defined, established, and significantly restricted by the length of the cantilever.

A further problem of generic handling devices is the restriction in terms of motion kinematics. When degrees of freedom in the movement of the cantilever or outrigger that support the gripping tool are implemented by an articulation, the outrigger can only be pivoted about this fulcrum. As a consequence thereof it is only possible for the gripping tools to move along a circular arc.

On account of the restricted distances and the motion patterns of the handling devices or of the gripping tools, respectively, that are established by circular arcs, devices of this type in spatial terms must be placed very close to the tire vulcanization machine in order for the treatment space to be able to be reached by the gripping tools and for the tire blanks to be able to be placed therein or for the finished tires to be removed therefrom, respectively. As a result of this placing restriction, one handling device typically has to be assigned to one tire vulcanization machine.

Therefore, the handling range can usually not be extended to cover a second or a plurality of tire vulcanization machines. This restriction in terms of use is significantly disadvantageous in particular because of the complex and expensive construction of the gripping tools which also have to be suitable for very sensitive finished tires that contain residual heat when the latter are removed from the tire vulcanization machine.

SUMMARY OF THE INVENTION

It is an object of the invention to provide a handling device for tires, which at least partially reduces the disadvantages mentioned and supports a cost effective overall construction.

As a solution, the construction according to the invention proposes to provide a handling device having at least one outrigger and at least two outrigger pivot points, the pivoting movements of the latter being at least partially coupled so as to form a total motion trajectory.

The teaching according to the invention recognizes that at least the handling range can be improved by an outrigger that is fixed to a base and mounts the gripping tool in a likewise pivotable manner. By way of this arrangement, pivoting of the outrigger relative to the base and/or pivoting of the gripping tool relative to the base and/or to the outrigger is supported. The invention provides that the at least two resulting degrees of freedom are either autonomous or at least partially parallel or at least partially coordinated and in geometrical terms are added so as to form a total motion trajectory.

If the pivoting possibilities are carried out sequentially, that is to say in a step-by-step manner one after the other, defined circular arc movements relative to the fulcrums result. The total motion trajectory in this case corresponds to a mathematical function which describes the two circular arcs and connects the latter by way of a point of discontinuity.

If the pivoting possibilities are entirely or partially implemented simultaneously and at least in parts of the available circular arc trajectory, it is possible by way of the superposition of the circular arc movements for a motion trajectory which corresponds to a largely and preferably consistent function. The resulting motion trajectory can be utilized both for expanding the handling range of the gripping tools as well as for increasing the flexibility in terms of the approachable gripping points.

In order for this to be achieved, it is necessary to be able to influence the radian of the respective circular movements, the mutual relation of the latter and/or the start and the stop of the pivoting movements in a controlled manner. In other words, in order for a defined total motion trajectory to be achieved it is necessary for the absolute pivoting movements, on the one hand, and the mutual correlation of the latter, on the other hand, to be influenced in a targeted manner.

In order for this object to be achieved, the invention provides at least one coupling means which at least in regions coordinates the individual pivoting movements so as to form a total motion trajectory. The concept further includes the coupling means to be assigned additional functional tasks and/or constructive design embodiments to be implemented.

The coupling means can be of various design embodiments in order for the relative circular arc trajectories of the individual pivoting movements about the installed fulcrums to be coordinated and for said individual pivoting movements to be converted to a total motion trajectory. For example, a linkage having degrees of pivoting freedom at the end sides can be fixed to the mutually pivotable components in a locationally fixed manner or in a manner so as to be movable in relative terms, said linkage coordinating a defined total motion trajectory by way of positioning. Another possibility lies in a second outrigger which is pivotably fixed to a base and couples the gripping tool components. Furthermore, the concept of the invention can be implemented by coupling by way of a step gear or a sliding block assembly.

The at least one coupling means according to the invention for coordinating the movements is preferably constructed in terms of geometry and/or function in such a manner that the radian value of at least one pivoting movement is maximized.

BRIEF DESCRIPTION OF THE DRAWING

An exemplary embodiment of the handling device according to the invention for tires is illustrated in the figures in which.

DETAILED DESCRIPTION OF THE INVENTION

Figure 1:
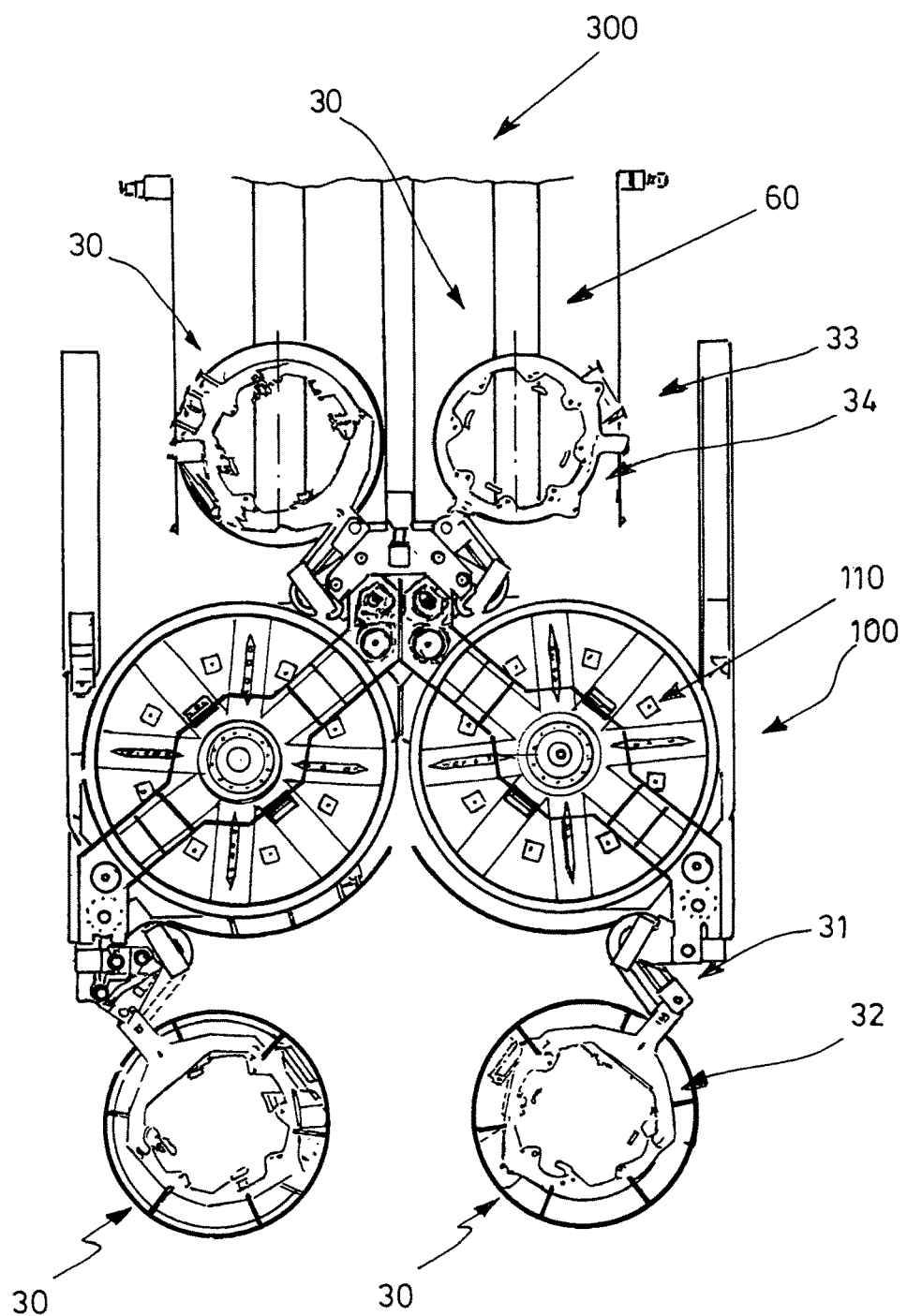
FIG. 1: shows the plan view of a tire vulcanization machine (100) having two treatment spaces (110), or two tire vulcanization machines (100), respectively, that are disposed so as to be mutually adjacent, having handling equipment that is implemented by handling devices (30) in the form of loaders (33), unloaders (31), and transportation devices (60, 300)

FIG. 1 shows the plan view of a tire vulcanization machine (100) having two treatment spaces (110), or two tire vulcanization machines (100), respectively, that are disposed so as to be mutually adjacent, each having one treatment space.

Provided is handling equipment that is implemented by handling devices (30) in the form of loaders (33), unloaders (31), and transportation devices (60, 300).

The plan view according to FIG. 1 highlights the functioning and the dimensional ratios of the handling equipment (30, 60, 300) in general and the handling device (30) in particular. In order for the vulcanization process to be carried out, the supply, loading, unloading, and discharge of tires into and out of the treatment space is required. In this context, the handling device (30) according to the invention is assigned loading and unloading in particular as tasks.

In the exemplary application shown, four handling devices (30) are installed, in each case two being assigned to one treatment chamber (110) herein. Per treatment chamber (110) one handling device (30) is provided as a loader (33) and one handling device (30) is provided as an unloader (31). The differentiation in terms of function between the loader and the unloader is derived by the design of the gripping tools (32, 34) which is designed so as to be reversible and thus as an exchangeable component part of the handling device. Independently of the gripping tool (32, 34) received, the construction of the handling device (30) is largely identical, the use of dissimilar gripping tools being supported in particular by way of a suitable receptacle.

Figure 2:
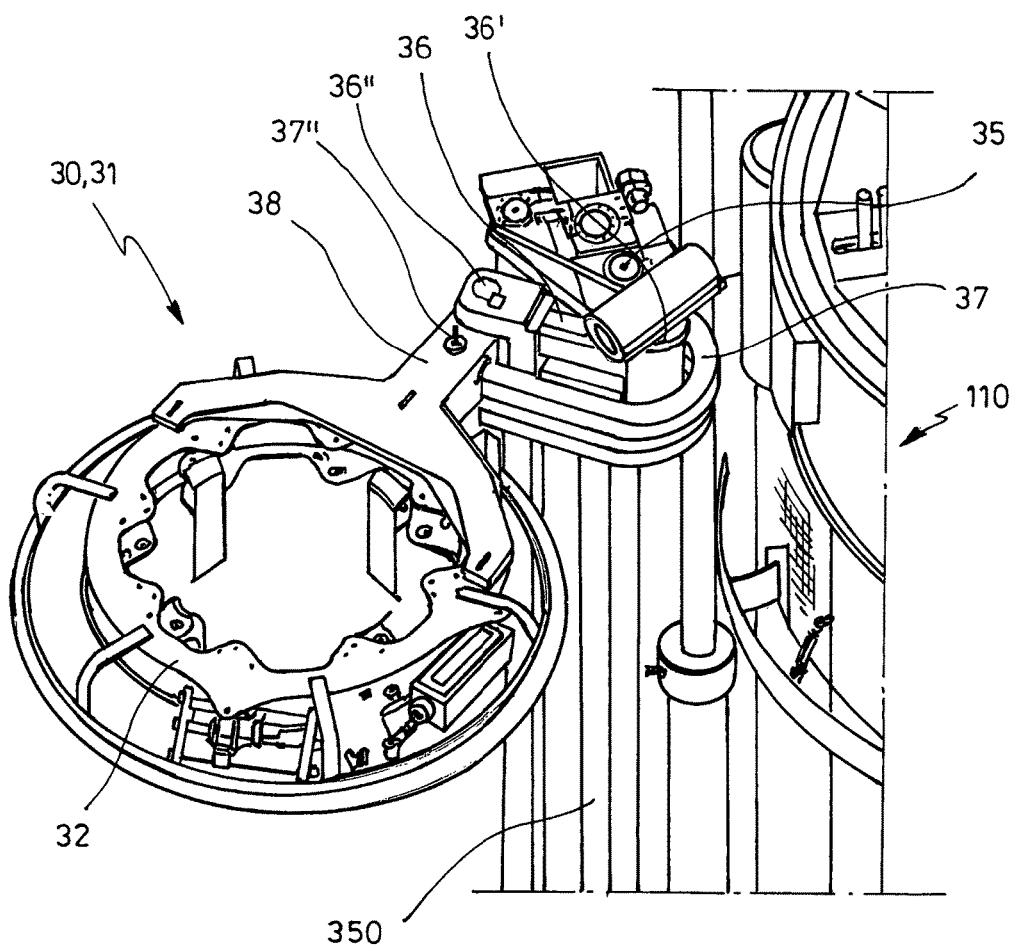
FIG. 2: shows the perspective view of a handling devices (30) configured as an unloader (31)

FIG. 2 depicts the perspective view of a handling device (30) that is configured as an unloader (31). This exemplary embodiment of the handling device (30) is formed by at least one outrigger (36) having a first outrigger pivot point (36') and one second outrigger pivot point (36"). The at least one outrigger (36) by way of the first outrigger pivot point (36') thereof is fixed to a support (35) in such a manner that the outrigger (36) is mounted so as to be pivotable about the first outrigger pivot point (36') by at least one radian value. The first outrigger pivot point (36') is preferably formed by a rotary joint, the rotation axis thereof enabling the outrigger (36) a degree of pivoting freedom in the horizontal plane. A tool arm (38) is fixed to the second outrigger pivot point (36") of the outrigger (36). The second outrigger pivot point (36") is preferably also formed by a rotary joint, the rotation axis of the latter permitting the tool arm a degree of pivoting freedom in the horizontal plane relative to the outrigger (36) and/or relative to the support (35) at least to the extent of one radian value.

Illustrated in FIG. 2 is the situation of outrigger pivot points (36', 36") that are in each case fixed to the end side of the outrigger (36) in a locationally fixed design embodiment. Another embodiment can provide the outrigger pivot points (36', 36") in a locationally variable design, such that the fulcrums are displaceable along the outrigger (36) and the total motion trajectory thus can be defined so as to be adapted to any situation. This can be implemented, for example, by slotted receptacles which connect the rotary joints (36', 36") to the outrigger (36).

The coupling means (37) of the variant of embodiment shown is formed by an arm, the ends of the latter conjointly with the respective connection partner forming a first and a second coupling means pivot point (37', 37"). In the present example, the first coupling means pivot point (37') is formed by way of a receptacle on the base (35), and the second coupling means pivot point (37") is formed by way of a receptacle on the tool arm (38). In this way, the invention implements a total motion trajectory by way of the coordination at least in regions of the pivoting movement of the outrigger (36) in relation to the base (35) about the first outrigger pivot point (36'), and of the pivoting movement of the tool arm (38) in relation to the outrigger (36) about the second outrigger pivot point (36").

This total motion trajectory that is coordinated at least in regions can be utilized in terms of two aspects. On the one hand, by way of the corresponding design embodiments of the geometrical absolute sizes, ratios, and positions of the outrigger (36), of the outrigger pivot points (36', 36"), of the coupling means (37), and of the coupling means pivot points (37', 37"), practically arbitrary local points in space can be approached and tires (200, 200') can be picked up and/or deposited. On the other hand, the handling range in absolute terms can be expanded.

A further increase in the handling range of the gripping tools (32, 34) and/or an increase in flexibility in terms of the approachable gripping points, is supported by the shaping of the coupling means (37) that is configured as an arm. If the arm (37) is at least partially curved and thus configured so as to deviate from a straight profile, it is possible for the radian value of at least one of the pivoting movements about one of the outrigger pivot points (36', 36") to be enlarged and thus for the range of the total motion trajectory to be yet again expanded.

It is preferably conceivable for the receptacle (35) to be configured as a base (35') and/or as a slide (35") of a repositioning installation (350) which is suitable for repositioning the handling device (30) and thus for supporting the degree of freedom in a third spatial direction.

Figure 3:
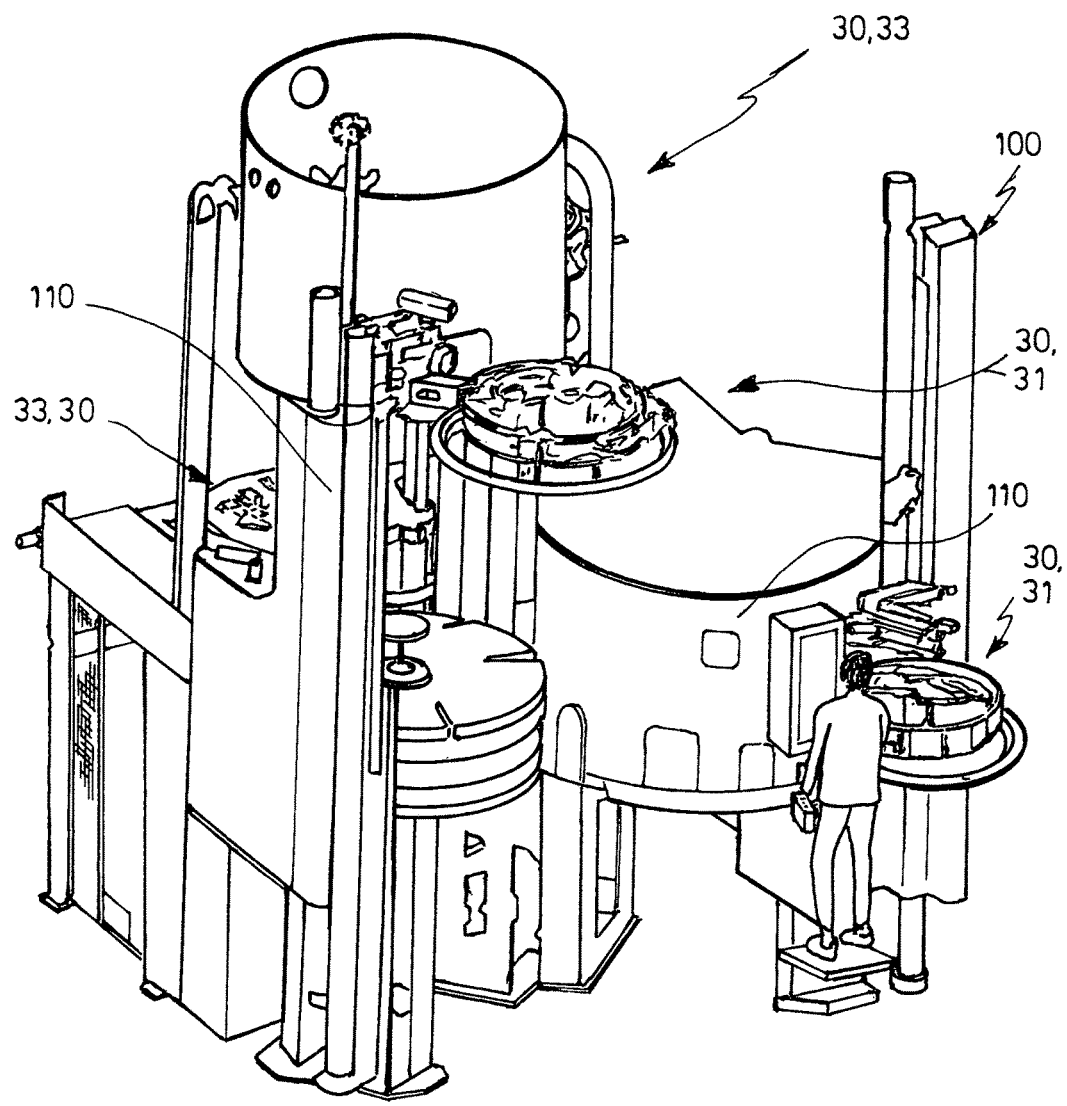
FIG. 3: shows the three-dimensional view of a tire vulcanization machine (100) having two treatment spaces (110), or two tire vulcanization machines (100), respectively, that are disposed so as to be mutually adjacent, having handling equipment that is similar to the situation as depicted in FIG. 1.

FIG. 3 comprises the three dimensional view of a tire vulcanization machine (100) having two treatment spaces (110), or two tire vulcanization machines (100), respectively, that are disposed so as to be mutually adjacent, having handling equipment that is similar to the situation as is depicted in FIG. 1. The illustration shows in particular the requirements in terms of the handling range of the gripping tools and of the flexibility of the approachable gripping points that is to be as high as possible, and the relative mutual size ratios of the individual components.

Figure 4:
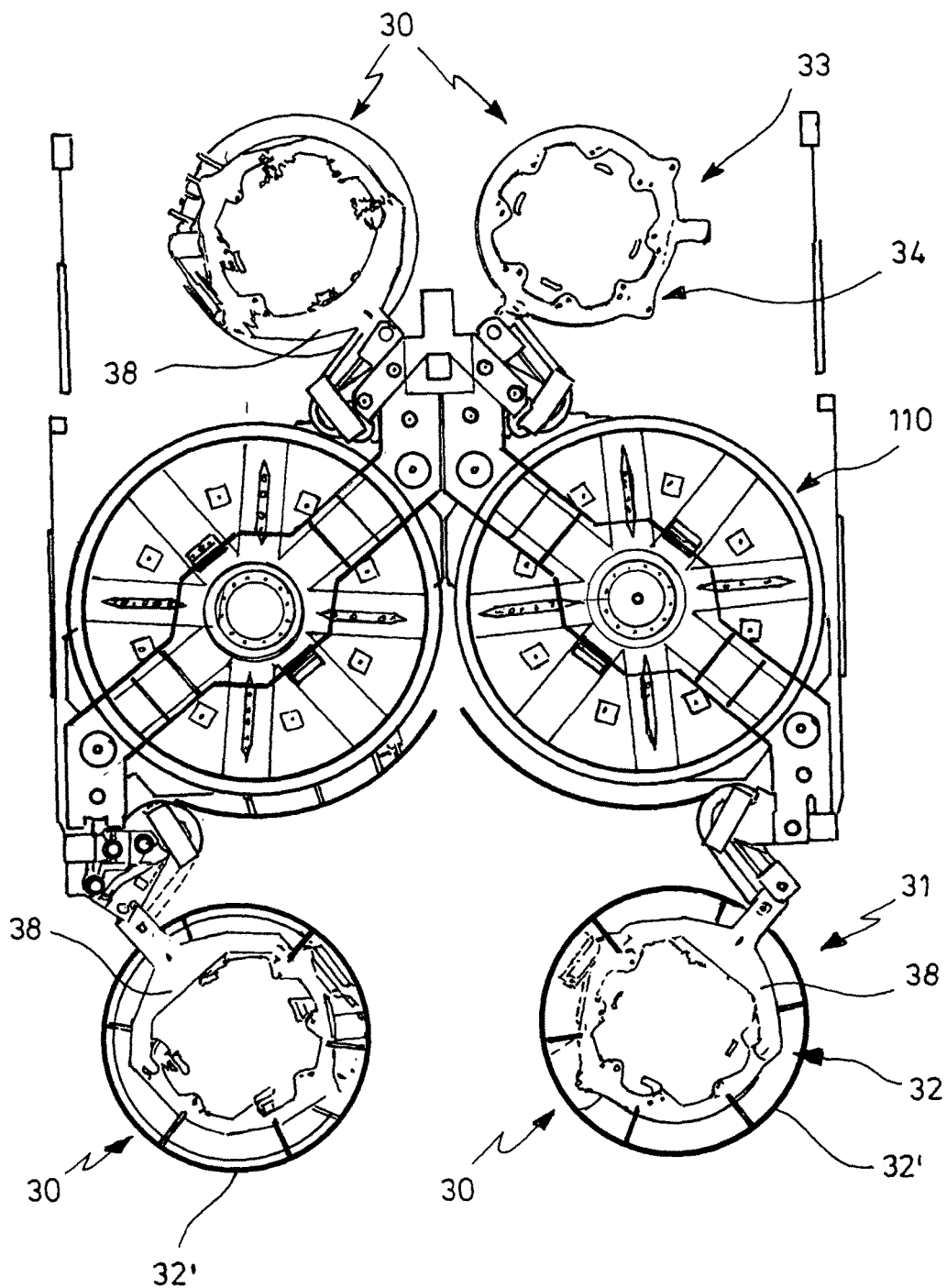
FIG. 4: shows the plan view of the perspective illustration of a tire vulcanization machine (100) having two treatment spaces (110), or two tire vulcanization machines (100), respectively, that are disposed so as to be mutually adjacent, having handling equipment that is implemented by handling devices (30) in the form of loaders (33), unloaders (31)

FIG. 4 shows the plan view of the perspective illustration of a tire vulcanization machine (100) having two treatment spaces (110), or having two tire vulcanization machines (100), respectively, that are disposed so as to be mutually adjacent, having handling equipment that is implemented by handling devices (30) in the form of loaders (33), unloaders (31).

The functional differentiation of the handling device (30) between a loader (33) and an unloader (31) is derived by the design of the gripping tools (32, 34) which by the respective tool arms (38) are mounted so as to be reversible and thus exchangeable.

The unloader (31) by way of a handling device (30) is formed in that an unloading gripping tool (32) is mounted by way of the tool arm (38). This unloading gripping tool (32) is adapted to the particular sensitivity of the finished tires (200) that contain residual heat that are to be unloaded from the treatment space (110) and is constructed so as to avoid damage and/or deformation. A spacer in the form of a ring (32') that is externally attached to the tool can be provided in order for the tire (200) that contains residual heat to be protected from contact when handled.

The loader (33) by way of a handling device (30) is formed in that a loading gripping tool (34) is mounted by way of the tool arm (38). Both the loading gripping tool (34) as well as the unloading gripping tool (32) can possess clamping jaws that engage on the tire (200, 200') either on the inside or the outside. A statically defined arrangement is supported by the use of three clamping jaws that are distributed on the circumference. Four or more clamping jaws can also be provided in order for a gripping situation that is as gentle as possible to be established.

Figure 5:
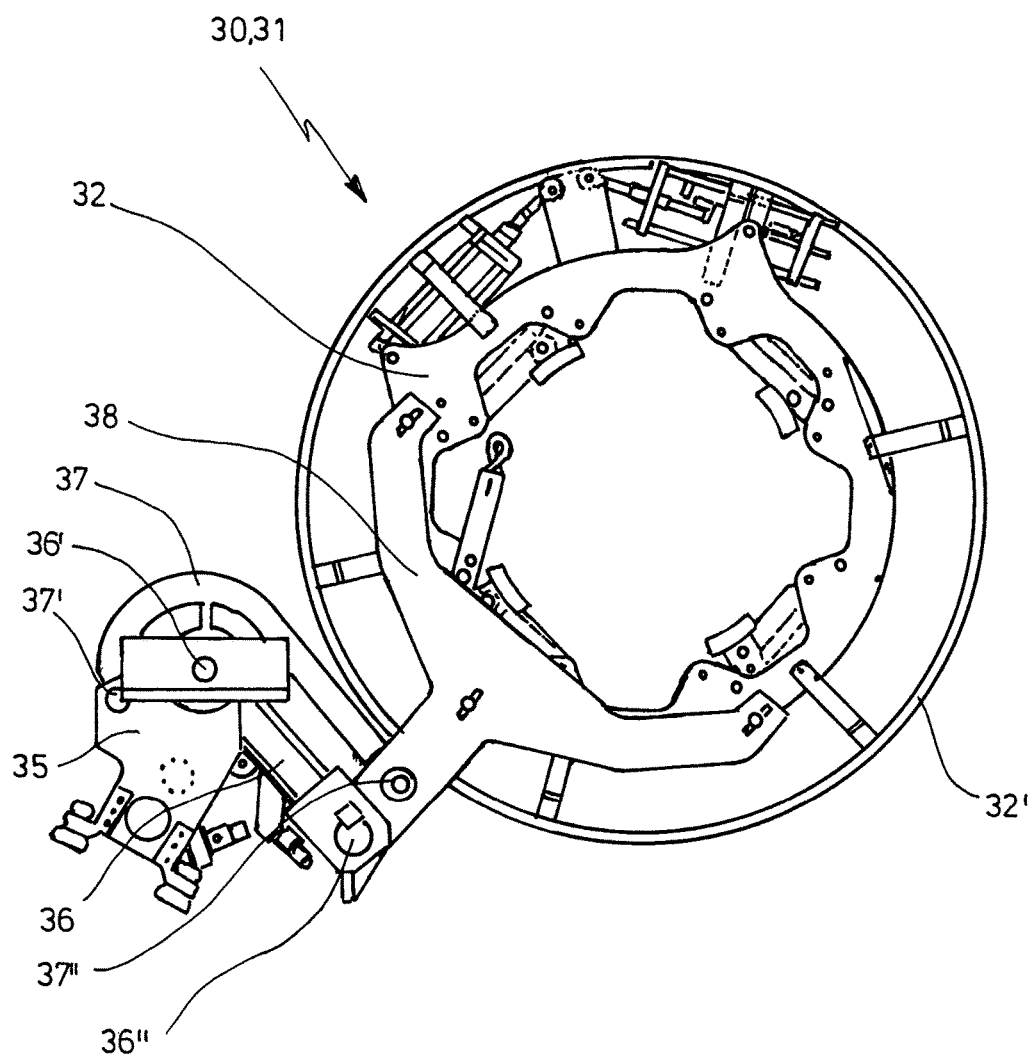
FIG. 5: shows the plan view of a perspective model of the handling device (30) according to the invention in an exemplary embodiment as an unloader (31) in the proximity of the first potential terminal position of a total motion trajectory.

FIG. 5 comprises the plan view of a perspective model of the handling device (30) according to the invention in an exemplary embodiment as an unloader (31) in the proximity of a first potential terminal position of a total motion trajectory. The respective terminal positions according to the invention can be defined and established in different ways. The geometrical definition of the terminal position is possible by way of the trapezoid-forming components composed of the coupling means (37), the outrigger (36), and the respective pivot points (36', 36", 37', 37") in relation to one another. Alternatively or additionally, end detents can be provided to this end. A further possibility lies in providing a controlled rotary drive in one of the pivot points (36', 36", 37', 37"), preferably in the first outrigger pivot point (36').

Figure 6:
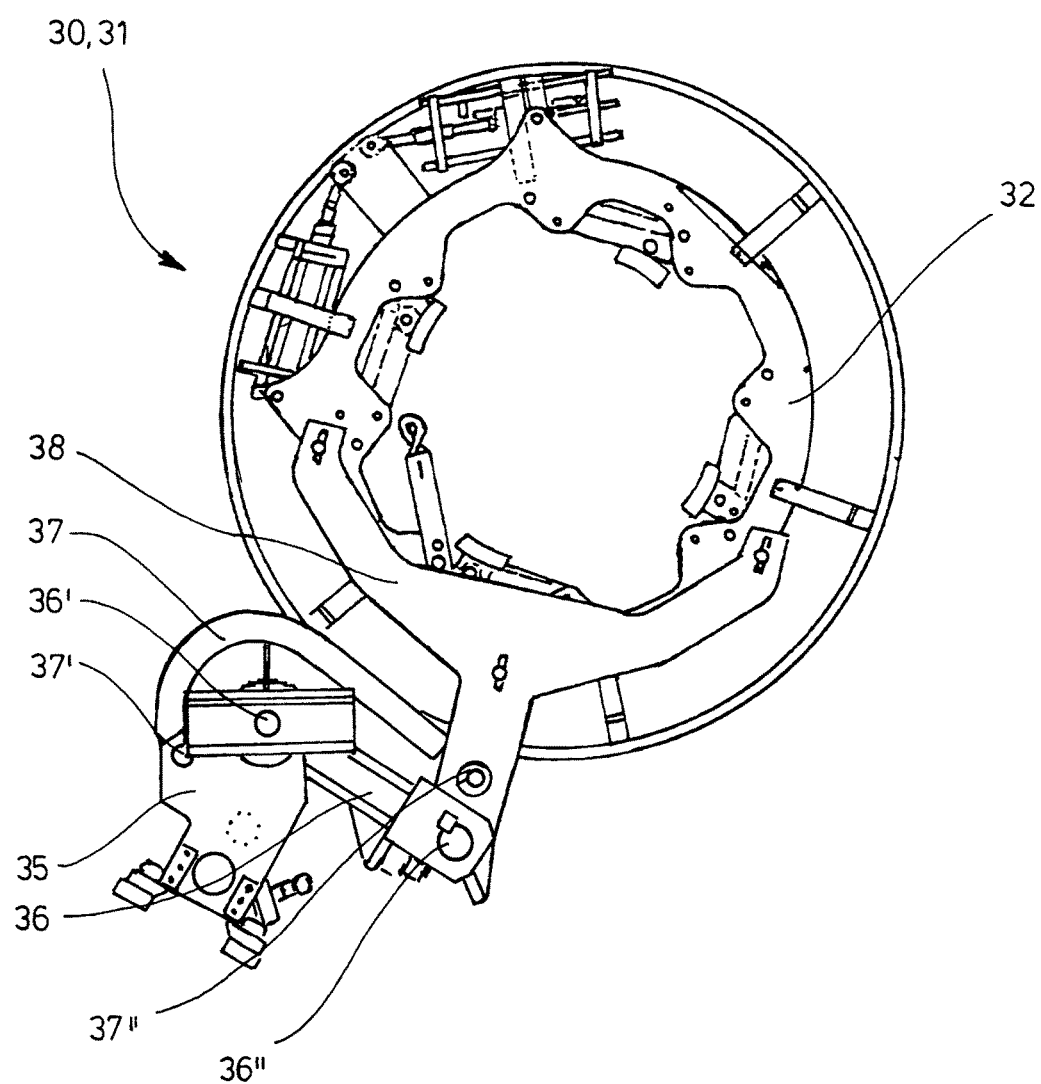
FIG. 6: shows the plan view of a perspective model of the handling device (30) according to the invention, in a manner analogous to that of FIG. 5, in an exemplary embodiment as an unloader (31) in a potential position of the total motion trajectory.

FIG. 6 depicts the plan view of a perspective model of the handling device (30) according to the invention, in a manner analogous to that of FIG. 5, in an exemplary embodiment as an unloader (31) in a potential position of the total motion trajectory. As opposed to FIG. 5, the gripping tool (32) of the handling device (30) is repositioned by way of an at least partial coordination of the pivoting movements.

Figure 7:
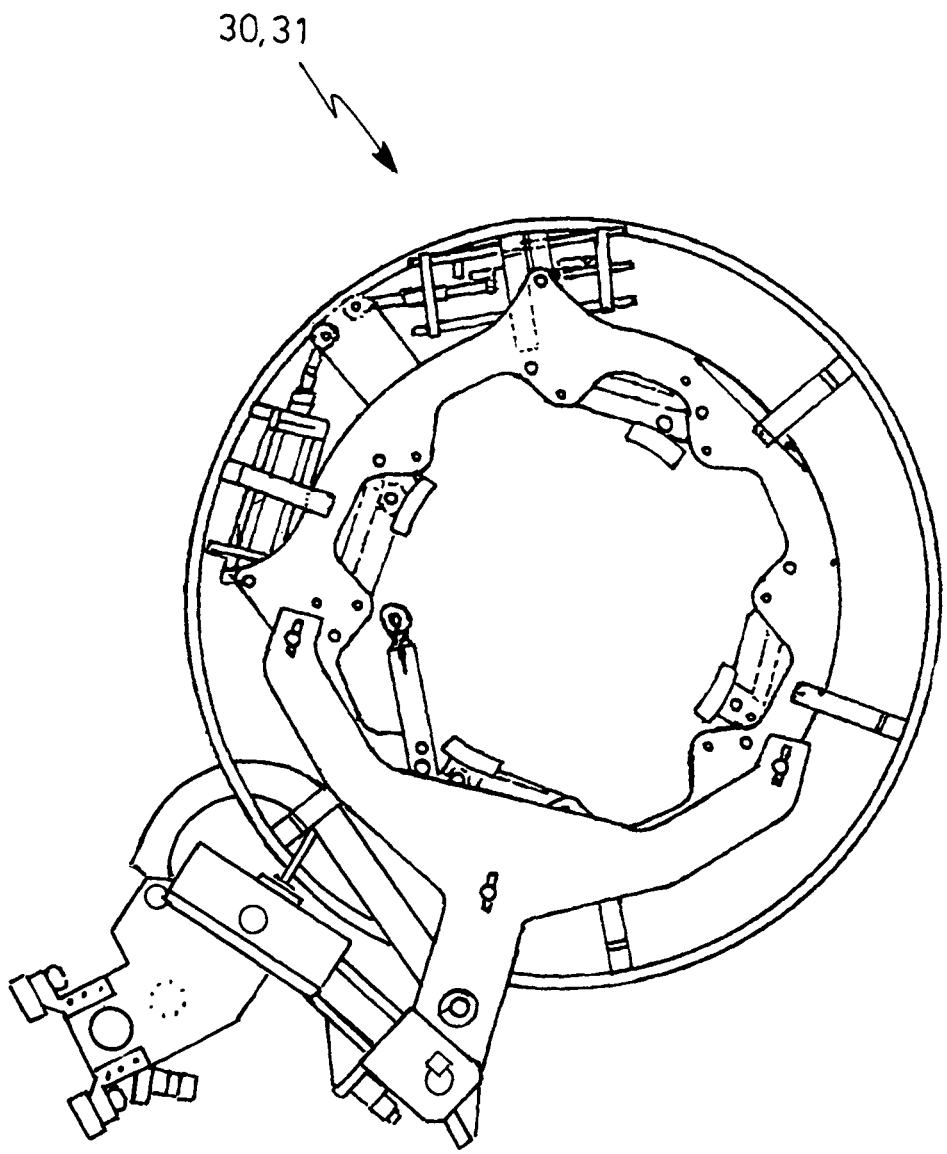
FIG. 7: shows the handling device (30) in a manner analogous to that of FIGS. 5 and 6, in a further potential position of the total motion trajectory.
Figure 8:
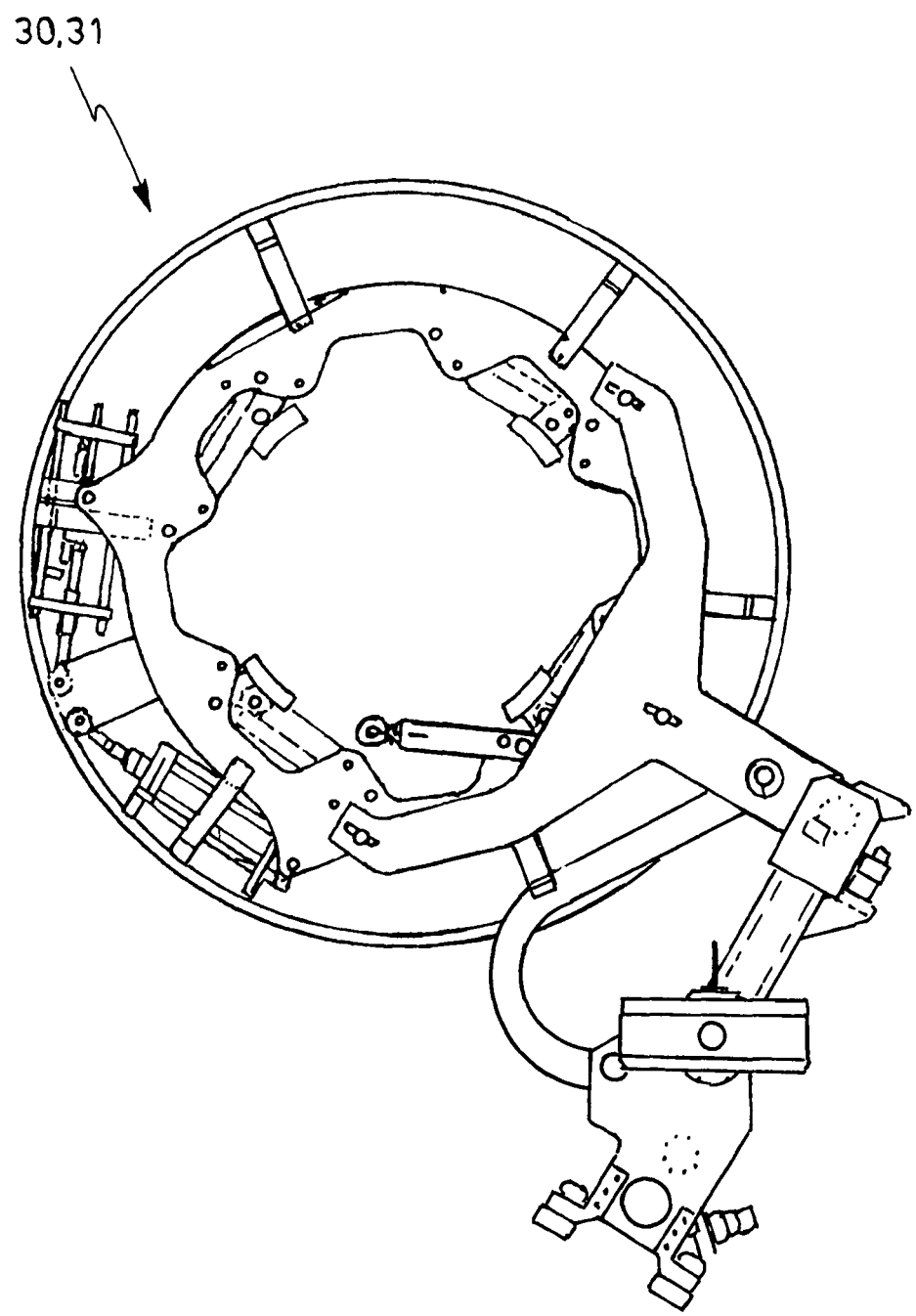
FIG. 8: shows the handling device (30) in a manner analogous to that of FIGS. 5 and 6, in a third potential position of the total motion trajectory.

FIGS. 7 and 8 show the handling device (30) in a manner analogous to that of FIGS. 5 and 6 in further potential positions of the total motion trajectory.

Figure 9:
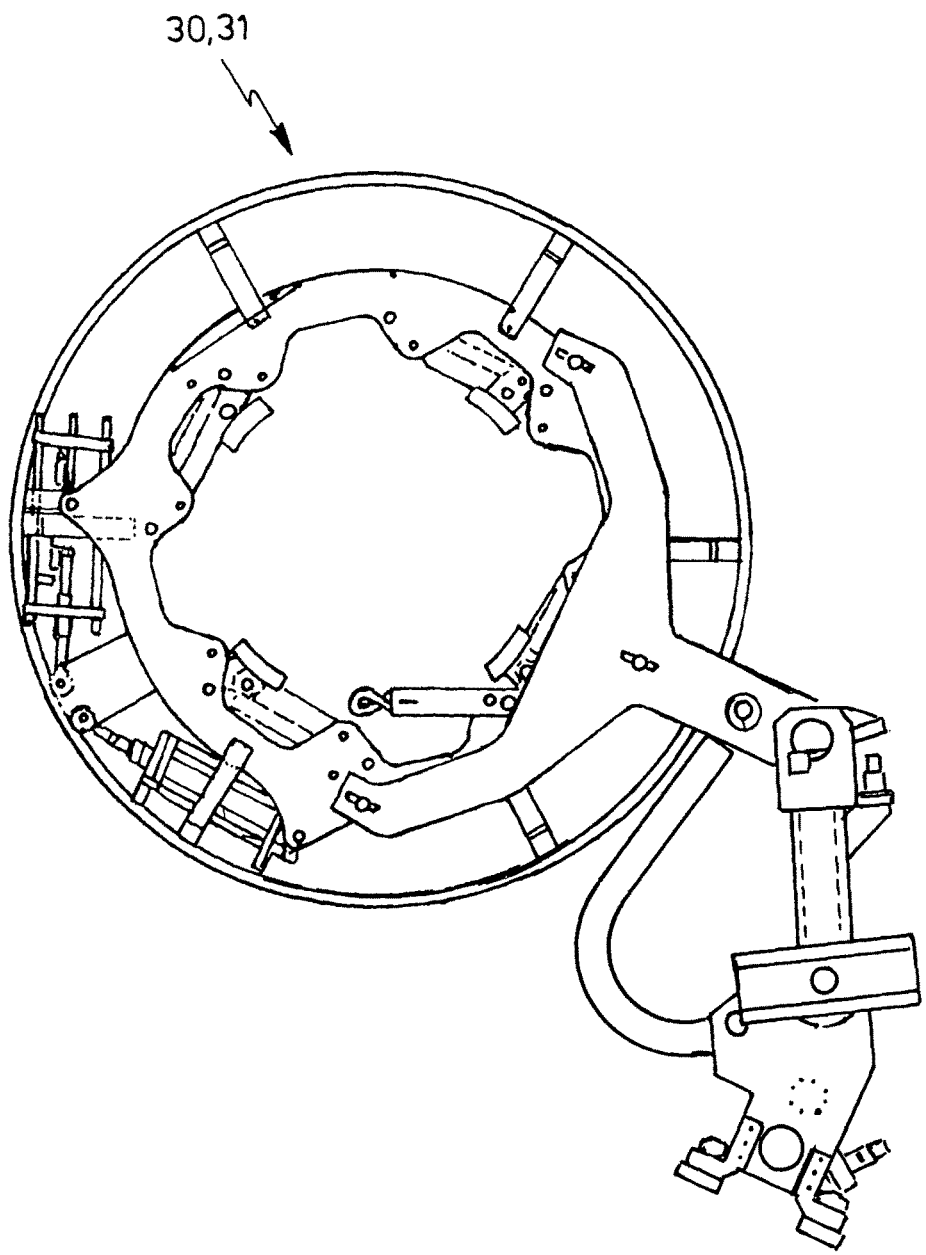
FIG. 9: shows the handling device (30) in a manner analogous to that of FIGS. 5 to 8, in the proximity of a second potential terminal position.

FIG. 9 illustrates the handling device (30) in a manner analogous to that of FIGS. 5 to 8, in the proximity of a second potential terminal position.

Figure 10:
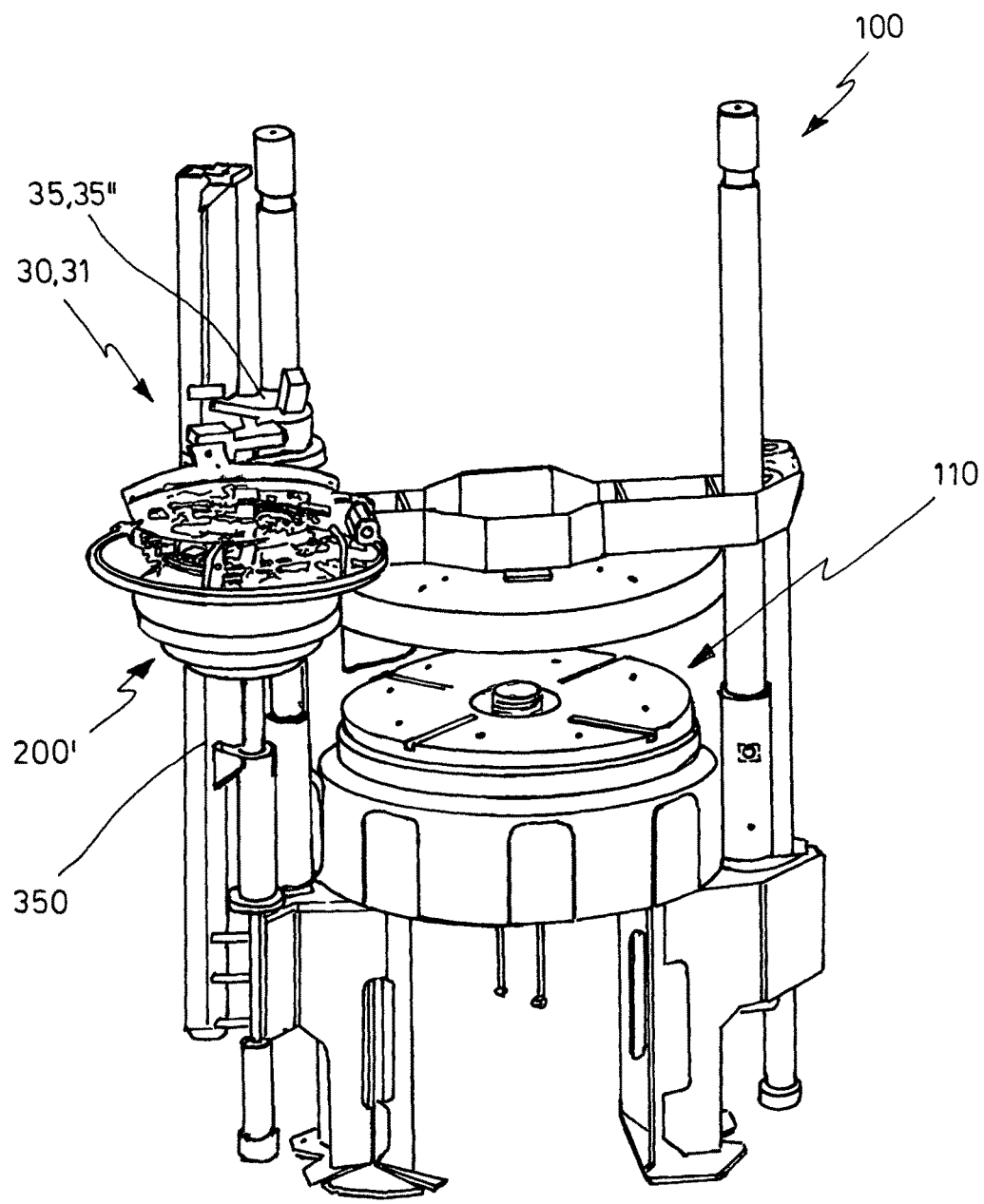
FIG. 10: shows the three-dimensional view of a tire vulcanization machine (100) having a treatment space (110) and the handling device (30) with a tire (200) received therein.

FIG. 10 illustrates the three-dimensional view of a tire vulcanization machine (100) having a treatment space (110) and the handling device (30) with a tire (200) received therein. In this exemplary embodiment, the receptacle (35) of the handling device (330) is designed as a slide (35") of a repositioning installation (350). The repositioning installation offers the possibility for expanding the degree of freedom that has been achieved in the horizontal plane by the total motion trajectory by a further spatial direction. In this way, gripping points within a handling space can be approached.

Figure 11:
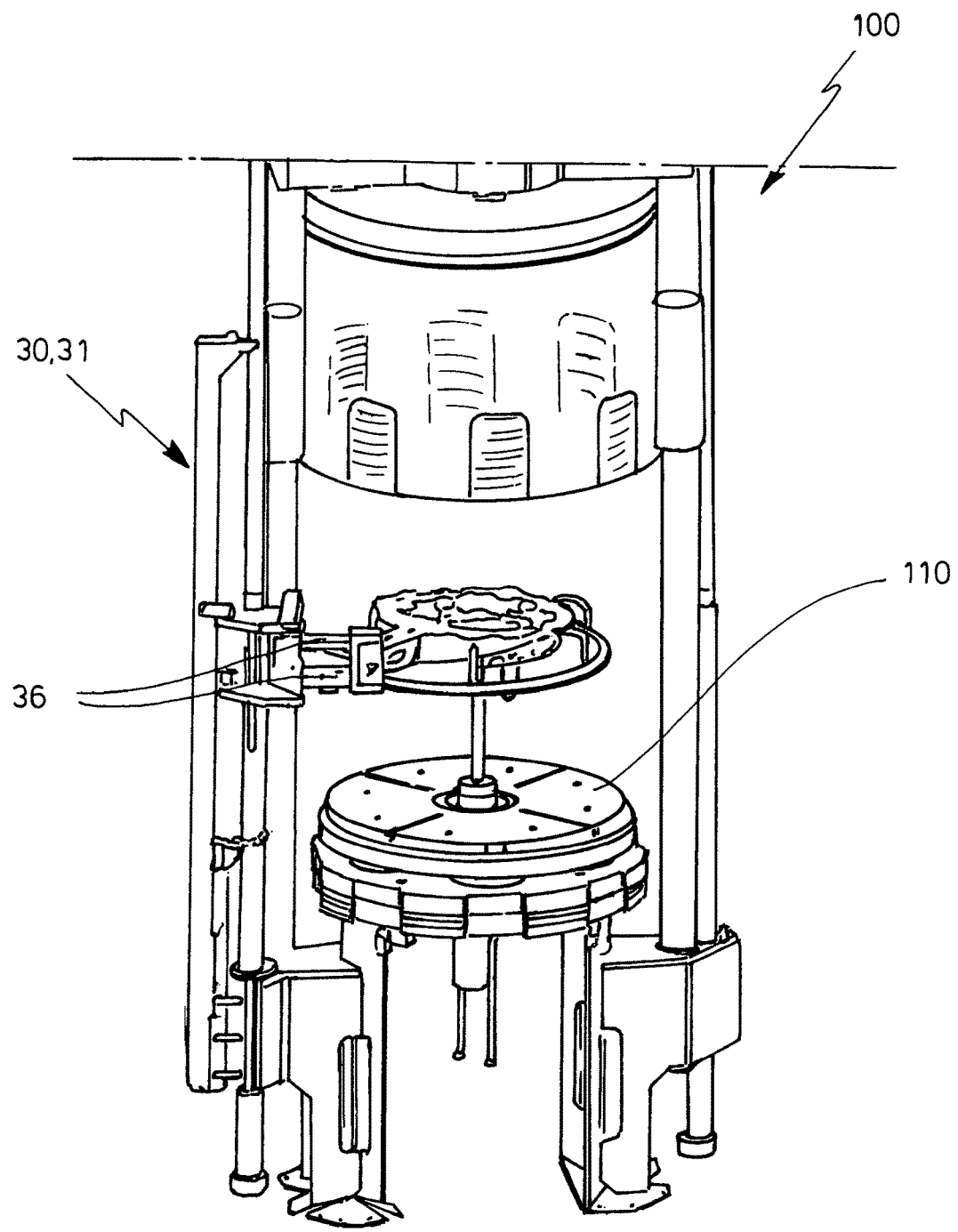
FIG. 11: shows the handling device (30) in a position with the gripping tool (32) within the treatment space (110).

FIG. 11 in a perspective view, in a manner analogous to that of FIG. 10, and with the treatment space (110) in the open position, highlights the handling device (30) in a position with the gripping tool (32) within the treatment space (110).

This view highlights a further design embodiment potential of the handling device (30) having an outrigger (36) that is formed by two arms. This construction in relation to outriggers having one arm offers a significantly increased design strength and load capability in that the effective forces can be distributed to 2 arms and the receptacles for the outrigger pivot points (36', 36") can be embodied so as to be more stable by a multiple.

A further increase in the design strength of the handling device (30) in its entirety can be supported in that the coupling means (37) apart from the coupling function thereof is designed in such a manner that said coupling means (37), practically as a third arm, absorbs further forces, bending torques, and torsional stresses that act on the entire construction.

The invention claimed is:

1. A handling device for tires, comprising: a receptacle arranged in a region of a base; a tool arm; at least one gripping tool; an outrigger having a first outrigger pivot point fixed to the receptacle so the outrigger is pivotable relative to the receptacle along a motion trajectory, the outrigger having a second outrigger pivot point that couples the at least one gripping tool by way of the tool arm to the outrigger so that the tool arm is pivotable relative to the outrigger and/or to the receptacle along the motion trajectory; a mechanical coupling that at least partially coordinates the pivoting movements about the outrigger pivot points so that a coordinated total motion trajectory of the gripping tool is supported by way of at least partially superposed pivoting movements, wherein the total motion trajectory of the gripping tool is a defined path; and a drive for moving the outrigger and the at least one gripping tool, wherein the handling device is a loader and/or unloader of a tire vulcanizing machine.

2. The handling device for tires according to claim 1, wherein the coordinated total motion trajectory extends in a horizontal plane.

3. The handling device for tires according to claim 1, wherein the coordinated total motion trajectory supports a handling range that is enlarged in relation to a pivoting movement about one of the outrigger pivot points.

4. The handling device for tires according to claim 1, wherein the coordinated total motion trajectory supports a number of approachable gripping points that is larger in relation to a pivoting movement about one of the outrigger pivot points.

5. The handling device for tires according to claim 1, wherein the coordinated total motion trajectory is described by a mathematical function which describes two circular arcs that are connected to a point of discontinuity.

6. The handling device for tires according to claim 1, wherein the coupling is coupled to the receptacle and/or to the tool arm so that the coupling and the outrigger form a trapezoidal leg arrangement.

7. The handling device for tires according to claim 1, wherein the coupling has a first central coupling pivot point and a second central coupling pivot point.

8. The handling device for tires according to claim 7, wherein each of the outrigger pivot points and the coupling pivot points is respectively formed by one rotary joint, wherein the rotary joints support a degree of freedom in at least one pivoting direction.

9. The handling device for tires according to claim 1, wherein the coupling conjointly with the receptacle in terms of function forms a trapezoidal control.

10. The handling device for tires according to claim 1, wherein the coupling is an arm.

11. The handling device for tires according to claim 10, wherein the coupling arm at least partially deviates from a straight extent such that at least one of the pivoting movements about one of the pivot points has an enlarged radian value.

12. The handling device for tires according to claim 2, wherein the receptacle is a base or a slide of a repositioning installation that supports a repositioning path in a vertical direction.

13. The handling device for tires according to claim 12, wherein gripping points for the gripping tool are provided to be approachable within a handling space.

14. The handling device for tires according to claim 1, wherein the outrigger is formed by two arms.

15. The handling device for tires according to claim 1, wherein the coupling is configured as a support arm so that, in addition to a coupling function, forces, bending torques, and torsional stresses are also absorbed.

16. The handling device for tires according to claim 1, wherein the tool arm holds the gripping tool in a releasable connection such that an unloading tool or a loading tool is receivable.

17. The handling device for tires according to claim 1, wherein the gripping tool is formed by at least three clamping jaws so that a tire is grippable in a statically defined manner.

18. The handling device for tires according to claim 17, wherein the gripping tool is an unloading tool that has a spacer formed as a ring that is externally attached to the unloading tool.

19. A tire vulcanization machine, comprising a handling device according to claim 1.

* * * * *